United States Patent
Märtensson et al.

(10) Patent No.: US 10,239,084 B2
(45) Date of Patent: Mar. 26, 2019

(54) METHODS AND DEVICES FOR JETTING VISCOUS MEDIUM ON WORKPIECES

(71) Applicant: Mycronic AB, Taby (SE)

(72) Inventors: Gustaf Märtensson, Solna (SE); Andreas Bergström, Stockholm (SE); Thomas Kurian, Stockholm (SE); Anders Emthén, Upplands Vaesby (SE)

(73) Assignee: MYCRONIC AB, Taby (SE)

( * ) Notice: Subject to any disclaimer, the term of this patent is extended or adjusted under 35 U.S.C. 154(b) by 0 days.

(21) Appl. No.: 15/254,113

(22) Filed: Sep. 1, 2016

(65) Prior Publication Data

US 2016/0368014 A1 Dec. 22, 2016

Related U.S. Application Data

(60) Division of application No. 14/218,243, filed on Mar. 18, 2014, now Pat. No. 9,808,822, which is a
(Continued)

(51) Int. Cl.
  *B05B 15/00* (2018.01)
  *B05B 15/70* (2018.01)
  (Continued)

(52) U.S. Cl.
  CPC ............ *B05B 15/70* (2018.02); *B05B 1/3046* (2013.01); *B05B 12/06* (2013.01);
  (Continued)

(58) Field of Classification Search
  CPC ....... B05B 15/10; B05B 1/3046; B05B 12/06; B05B 15/06; B41J 2/14; B41J 2/14201;
  (Continued)

(56) References Cited

U.S. PATENT DOCUMENTS 6,153,034 A * 11/2000 Lipsker .................. B29C 41/36
  156/167
7,393,073 B2 * 7/2008 Zach ......................... B41J 3/28
  347/12

(Continued)

FOREIGN PATENT DOCUMENTS

CN      1216149 A      5/1999
CN      1312572 A      9/2001
(Continued)

OTHER PUBLICATIONS

English Machine Translation of JP2002-140982, Yasuda et al, published May 17, 2002.*
(Continued)

*Primary Examiner* — Laura Edwards
(74) *Attorney, Agent, or Firm* — Harness, Dickey & Pierce, P.L.C.

(57) ABSTRACT

An apparatus for depositing and/or jetting viscous medium on a surface of a workpiece includes at least two depositing head assemblies. The at least two depositing head assemblies are configured to move in three dimensional space. The at least two depositing head assemblies are also configured to at least one of concurrently and simultaneously deposit the viscous medium on the workpiece.

5 Claims, 11 Drawing Sheets

Related U.S. Application Data continuation of application No. PCT/EP2014/054987, filed on Mar. 13, 2014.

(60) Provisional application No. 61/799,799, filed on Mar. 15, 2013.

(51) Int. Cl.

| | | |
|---|---|---|
| *B29C 64/112* | (2017.01) | |
| *B05C 5/02* | (2006.01) | |
| *B41J 2/14* | (2006.01) | |
| *B05B 1/30* | (2006.01) | |
| *B05B 12/06* | (2006.01) | |
| *B05B 13/02* | (2006.01) | |
| *B05B 13/04* | (2006.01) | |
| *B05B 17/06* | (2006.01) | |

(52) U.S. Cl.
CPC .......... *B05B 13/0221* (2013.01); *B05B 13/04* (2013.01); *B05B 17/0607* (2013.01); *B05C 5/027* (2013.01); *B29C 64/112* (2017.08); *B41J 2/14* (2013.01); *B41J 2202/05* (2013.01)

(58) Field of Classification Search
CPC ........ B41J 2202/05; B41J 11/002; B41J 2/01; B23K 35/0222; B23K 15/0073; B23K 3/0607; B23K 3/082; B23K 3/0653; B05C 5/027; B05C 5/0275; B05C 5/0279; B05C 5/0291; B05C 5/0295; B29C 64/112; B29C 64/205; B33Y 30/00
USPC .......... 118/313, 323; 148/23, 24; 228/248.1, 228/248.5, 31, 41, 254
See application file for complete search history.

(56) References Cited

U.S. PATENT DOCUMENTS

| | | | |
|---|---|---|---|
| 7,625,198 B2* | 12/2009 | Lipson .................... | A61L 27/36 425/169 |
| 7,682,652 B2 | 3/2010 | Baik et al. | |
| 2002/0009536 A1 | 1/2002 | Iguchi et al. | |
| 2005/0167519 A1 | 8/2005 | Holm et al. | |
| 2006/0092204 A1 | 5/2006 | White et al. | |
| 2006/0093751 A1 | 5/2006 | White et al. | |
| 2006/0118228 A1 | 6/2006 | Toyoda et al. | |
| 2006/0223316 A1 | 10/2006 | Baik et al. | |
| 2010/0053264 A1 | 3/2010 | Cho et al. | |
| 2013/0119536 A1* | 5/2013 | Hada ...................... | H01L 24/11 257/737 |

FOREIGN PATENT DOCUMENTS

| | | |
|---|---|---|
| CN | 1123040 C | 10/2003 |
| CN | 1669373 A | 9/2005 |
| CN | 100441070 C | 12/2008 |
| CN | 105188957 A | 12/2015 |
| EP | 0884754 A1 | 12/1998 |
| EP | 0 930 641 A2 | 7/1999 |
| JP | 2002-140982 A | 5/2002 |
| JP | 2002136908 A | 5/2002 |
| JP | 2010056522 A | 3/2010 |
| JP | 4743957 B2 | 8/2011 |
| WO | WO-2004010753 A1 | 1/2004 |

OTHER PUBLICATIONS

Office Action for Chinese Application No. 201480025565.3 dated Nov. 1, 2016 and English translation thereof.
English translation of Chinese Office Action dated Jul. 4, 2017, for Chinese Application No. 201480025565.3.
Office Action issued in U.S. Appl. No. 14/218,243, dated Jan. 26, 2017.
Office Action issued in U.S. Appl. No. 14/218,243, dated Aug. 1, 2016.
International Search Report and Written Opinion of the International Searching Authority dated Dec. 22, 2014 in International Application No. PCT/EP2014/054987.
International Preliminary Report on Patentability dated Sep. 15, 2015 in International Application No. PCT/EP2014/054987.
Restriction Requirement dated Feb. 2, 2016 in U.S. Appl. No. 14/218,243.
Chinese Office Action dated Oct. 22, 2018 issued in corresponding Chinese Application No. 201710177021.4 (translation).

\* cited by examiner

PRIOR ART

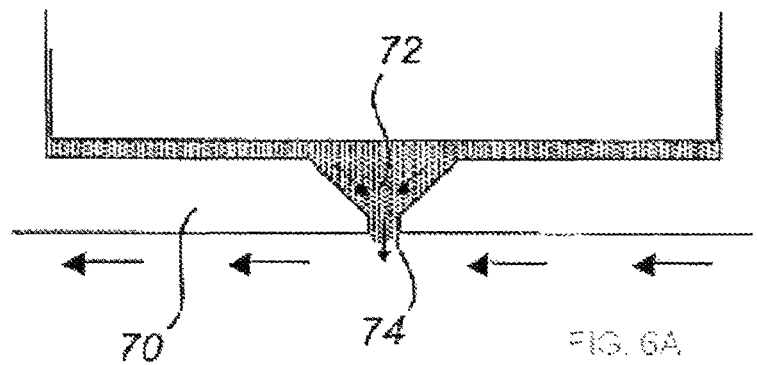
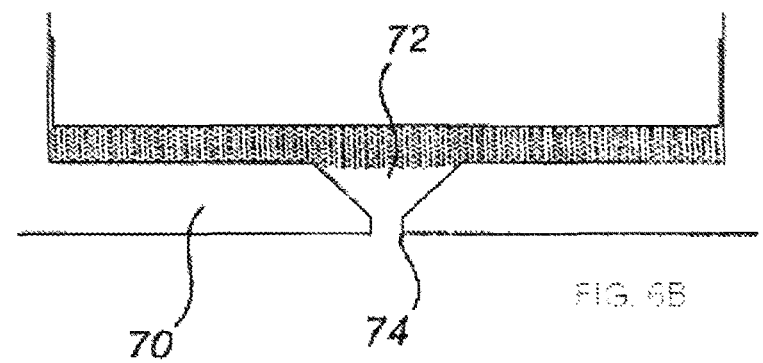
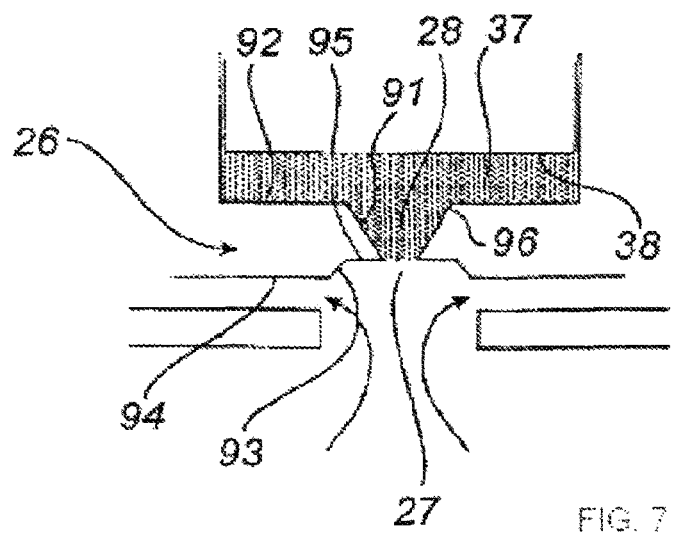

METHODS AND DEVICES FOR JETTING VISCOUS MEDIUM ON WORKPIECES

CROSS-REFERENCE TO RELATED APPLICATIONS

This application is a divisional of U.S. application Ser. No. 14/218,243, filed on Mar. 18, 2014 and issued on Nov. 7, 2017 as U.S. Pat. No. 9,808,822, which is a continuation of international application no. PCT/EP2014/054987, filed on Mar. 13, 2014, which claims priority to provisional application No. 61/799,799, filed on Mar. 15, 2013, the entire contents of all of the above-mentioned applications are incorporated herein by reference.

BACKGROUND

Conventionally, deposits are formed on workpieces (e.g., substrates) prior to mounting components by jetting droplets of viscous medium (e.g., solder paste, glue, etc.) onto the workpiece. A conventional jetting system generally includes: a nozzle space for containing a relatively small volume of viscous medium prior to jetting; a jetting nozzle coupled to the nozzle space; an impacting device for impacting and jetting the viscous medium from the nozzle space through the jetting nozzle in the form of droplets; and a feeder to feed the medium into the nozzle space.

FIG. 1 illustrates an example of a conventional machine 1 to jet droplets of a viscous medium onto a workpiece 2.

Referring to FIG. 1, the machine 1 includes an X-beam 3 and an X-wagon 4 connected to the X-beam 3 via an X-rail 16 and reciprocally movable along the X-rail 16. The X-beam 3 is reciprocally and movably connected to a Y-rail 17, thereby being movable in directions perpendicular to the X-rail 16. The Y-rail 17 is rigidly mounted in the machine 1. Movement of the X-wagon 4 and the X-beam 3 may be driven by linear motors (not shown).

A conveyer 18 feeds the workpiece 2 through the jetting machine 1. When the workpiece 2 is in the appropriate position under the X-wagon 4, a locking device 19 fixes the workpiece 2 in place. A camera 7 locates fiducial markers on the surface of the workpiece 2 to determine the precise position of the workpiece 2. Viscous medium is applied to the workpiece 2 at desired locations by moving the X-wagon 4 over the workpiece 2 in a given, desired or predetermined pattern and operating a jetting assembly 5 at given, desired or predetermined locations.

The machine 1 also includes an exchange assembly support 20 supporting further assemblies 22, and a vacuum ejector 6.

Since production speed is a relatively important factor in the manufacturing of electronic circuit boards, the application of viscous medium is typically performed "on the fly". Unfortunately, with conventional technology such as the jetting system shown in FIG. 1, production speed is somewhat limited.

SUMMARY

The technology disclosed provides methods and apparatuses for jetting viscous medium on a surface of a workpiece. The apparatuses include at least two depositing head assemblies for depositing viscous medium, and at least one of the at least two depositing head assemblies is a jetting head assembly.

According to at least one example implementation of the technology disclosed, the at least two depositing head assemblies for depositing viscous medium include at least one jetting head assembly, where the at least two depositing head assemblies are configured to move in three dimensional space, and are configured to at least one of concurrently and simultaneously deposit or jet the viscous medium on a workpiece.

According to at least one example implementation of the technology disclosed, the apparatus includes: at least two jetting head assemblies configured to move in three dimensional space, and configured to at least one of concurrently and simultaneously jet the viscous medium on a workpiece.

According to at least some example implementations of the technology disclosed, at least two jetting head assemblies may be configured to move in three dimensions at least one of concurrently and simultaneously, and may be further configured to shoot different droplet sizes or volumes. For example, a first jetting head assembly of the at least two jetting head assemblies may be configured to deposit viscous medium (e.g., solder paste) by shooting droplet volumes of about 5 nL, and a second jetting head assembly of the at least two jetting head assemblies may be configured to deposit viscous medium by shooting droplet volumes of about 15 nL.

According to at least some example implementations of the technology disclosed, at least two jetting head assemblies may be configured to move in three dimensions at least one of concurrently and simultaneously, and may further be configured to shoot viscous medium within certain mutually different specified ranges of volumes. For example, a first jetting head assembly of the at least two jetting head assemblies may be configured to deposit viscous medium on a surface (e.g., solder paste) by shooting droplet volumes within the range of about 5-15 nL, and a second jetting head assembly of the at least two jetting head assemblies may be configured to deposit viscous medium on a surface by shooting droplet volumes within the range of about 10-20 nL. In another example implementation of the technology disclosed a first jetting head assembly of the at least two jetting head assemblies may be configured to deposit viscous medium (e.g., solder paste) by shooting droplet volumes within the range of about 10-20 nL, and a second head assembly of the at least two jetting head assemblies may be configured to deposit viscous medium by shooting droplet volumes within the range of about 1-5 nL. In another example implementation of the technology disclosed, a first jetting head assembly of the at least two jetting head assemblies may be configured to deposit viscous medium (e.g., solder paste) by shooting droplet volumes of about 4 nL, and a second jetting head assembly of the at least two jetting head assemblies may be configured to deposit viscous medium by shooting droplet volumes of about 10 nL.

According to at least some example implementations, the apparatus for jetting viscous medium may further include: a platform configured to hold the workpiece; a first beam arranged above the platform, a first of at least two depositing head assemblies is a jetting head assembly being movably fixed to the first beam; and a second beam arranged above the platform and in parallel with the first beam, a second of the at least two depositing head assemblies being movably fixed to the second beam. The first jetting head assembly may be configured to move along the first beam in a first direction, and the second depositing head assembly may be configured to move along the second beam in the first direction. The first and second beams may be configured to move in a second direction, which is perpendicular to the first direction. The first and second beams and the at least two depositing head assemblies may be configured to move at least one of simultaneously and concurrently. The first and second depositing head assemblies (e.g., jetting head assemblies) may be further configured to move in a third direction, which is perpendicular to the first and second directions.

According to at least some example implementations, the apparatus for jetting viscous medium may further include: a platform configured to hold the workpiece; and a beam arranged above the platform, the at least two depositing head assemblies including at least one jetting head assembly movably fixed to the beam. The at least two depositing head assemblies may be configured to move along the beam in a first direction. The beam may be configured to move in a second direction. The beam and the at least two jetting head assemblies may be configured to move at least one of simultaneously and concurrently.

According to at least some example implementations, the at least two depositing head assemblies include at least two jetting head assemblies that are configured to at least one of: shoot different types/classes of solder pastes; shoot droplets with different shot sizes/ranges; and shoot droplets of various types of viscous media.

At least one other example implementation provides an apparatus for jetting viscous medium on a workpiece that is moving while jetting the viscous medium on the workpiece. According to at least this example embodiment, the apparatus includes: at least two supporting arrangements (e.g. cylindrical rollers) configured to move the workpiece in a first direction by transferring the workpiece from a first of the supporting arrangements to a second of the supporting arrangements; and at least one jetting head assembly configured to move in at least the first direction and a second direction, the jetting head assembly being further configured to jet the viscous medium on the workpiece at least one of concurrently and simultaneously while the workpiece moves between the first and second supporting arrangements (e.g., cylindrical rollers).

According to at least some example embodiments of this implementation, the workpiece may be a flexible substrate. The jetting head assembly may include at least two jetting head assemblies configured to at least one of: shoot different types/classes of solder pastes; shoot droplets with different shot sizes/ranges; and shoot droplets of various types of viscous media.

At least one other example implementation provides a linescan jetting apparatus for jetting viscous medium on a workpiece. According to at least this example embodiment, the apparatus includes: a conveyor configured to carry the workpiece in a first direction; a first set of beams extending longitudinally between opposite sides of a jetting head assembly frame; a second set of beams extending longitudinally between the first set of beams, the second set of beams including a first beam and a second beam; and a first jetting head assembly movably fixed to the first beam, the first jetting head assembly being configured to move along the first beam in a second direction, which is perpendicular to the first direction; and a second jetting head assembly fixed to the second beam, the second jetting head assembly being configured to move along the second beam in the second direction.

Another implementation of the technology disclosed provides for a linescan jetting apparatus for jetting viscous medium on a workpiece. In this example, the apparatus includes: a conveyor configured to carry the workpiece in a first direction; a beam extending longitudinally between opposite sides of a jetting head assembly frame; and a single jetting head assembly movably fixed to the beam, the first jetting head assembly being configured to move along the beam in a second direction, which is perpendicular to the first direction.

According to at least some example implementations of the technology disclosed, the conveyor may be configured to move the workpiece incrementally through the linescan jetting apparatus. The first and second jetting head assemblies may be configured to at least one of concurrently and simultaneously jet viscous medium on the workpiece. The first and second jetting head assemblies may be configured to move in a third direction, which is perpendicular to the first and second directions. The first and second jetting head assemblies may be configured to at least one of: shoot different types/classes of solder pastes; shoot droplets with different shot sizes/ranges; and shoot droplets of various types of viscous media.

At least one other example embodiment provides a linescan jetting apparatus for jetting viscous medium on a workpiece. According to at least this example embodiment, the apparatus includes: a conveyor configured to carry the workpiece in a first direction; a first set of beams extending longitudinally between opposite sides of a jetting head assembly frame; at least one second beam extending longitudinally between the first set of beams; and a first jetting head assembly movably fixed to the second beam, the first jetting head assembly being configured to move along the first beam in a second direction, which is perpendicular to the first direction.

At least one other example embodiment provides a method for jetting viscous medium on a workpiece. According to at least this example embodiment, the method includes: moving at least two jetting head assemblies in three dimensional space; and jetting, at least one of concurrently and simultaneously by the at least two jetting head assemblies, the viscous medium on the workpiece.

According to at least some example embodiments, the method may further include: moving the at least two jetting head assemblies in three dimensions at least one of concurrently and simultaneously.

According to at least some example embodiments, the moving may include: moving a first of the at least two jetting head assemblies along a first beam arranged above a platform holding the workpiece; and moving a second of the at least two jetting head assemblies along a second beam arranged above the platform and in parallel with the first beam. The first jetting head assembly may move along the first beam in a first direction, and the second jetting head assembly moves along the second beam in the first direction.

According to at least some example embodiments, the moving at least two jetting head assemblies may further include: moving the first and second beams in a second direction, which is perpendicular to the first direction. The first and second beams and the at least two jetting head assemblies may move at least one of simultaneously and concurrently.

According to at least some example embodiments, the moving at least two jetting head assemblies may further include: moving the first and second jetting head assemblies in a third direction, which is perpendicular to the first and second directions. The at least two jetting head assemblies may move in a first direction along a beam arranged above a platform holding the workpiece. The beam may move in a second direction. The beam and the at least two jetting head assemblies may move at least one of simultaneously and concurrently.

According to at least some example embodiments, the jetting may include at least one of: shooting different types/ classes of solder pastes with the at least two jetting assemblies; shooting droplets with different shot sizes/ranges with the at least two jetting assemblies; and shooting droplets of various types of viscous media with the at least two jetting assemblies.

At least one other example embodiment provides a method for jetting viscous medium on a workpiece. According to at least this example embodiment, the method includes: moving the workpiece in a first direction by transferring the workpiece from a first support arrangement (e.g., a cylindrical roller) to a second support arrangement; moving at least one jetting head assembly in at least the first direction and a second direction; and jetting, by the jetting head assembly, the viscous medium on the workpiece at least one of concurrently and simultaneously while the workpiece moves between the first and second support arrangements (e.g., cylindrical rollers).

According to at least some example embodiments, the workpiece may be a flexible substrate. In other example implementations, the jetting may be performed by at least two jetting head assemblies that are mutually different in their configurations in that they are configured to at least one of: shooting different types/classes of solder pastes; shooting droplets with different shot sizes/ranges; and shooting droplets of various types of viscous media (e.g., a first jetting head assembly may be configured to droplets).

At least one other example embodiment provides a linescan jetting method for jetting viscous medium on a workpiece. According to at least this example embodiment, the method includes: moving the workpiece in a first direction; jetting, by a first jetting head assembly movably fixed to a first beam, the viscous medium on the workpiece while moving the first jetting head assembly along the first beam in a second direction, which is perpendicular to the first direction; and jetting, by a second jetting head assembly fixed to a second beam, viscous medium on the workpiece while moving the second jetting head assembly along the second beam in the second direction.

According to at least some example embodiments, the workpiece may move incrementally through the linescan jetting apparatus. The first and second jetting head assemblies may jet viscous medium on the workpiece at least one of concurrently and simultaneously. The method may further include: moving the first and second jetting head assemblies in a third direction, which is perpendicular to the first and second directions.

According to at least some example embodiments, the jetting by the first and second jetting head assemblies may include at least one of: shooting different types/classes of solder pastes; shooting droplets with different shot sizes/ranges; and shooting droplets of various types of viscous media.

At least one other example embodiment provides a linescan jetting method for jetting viscous medium on a workpiece. According to at least this example embodiment, the method includes: moving the workpiece in a first direction and in a step-wise movement forward; and jetting, by a jetting head assembly movably fixed to a beam, the viscous medium on the workpiece while moving along the beam in a second direction, which is perpendicular to the first direction.

BRIEF DESCRIPTION OF DRAWINGS

The drawings described herein are for illustration purposes only and are not intended to limit the scope of the present disclosure in any way.

FIGS. 6A and 6B illustrate operation principles of a jetting head assembly;

FIG. 7 is a schematic view of an example nozzle;

DETAILED DESCRIPTION

Figure 1:
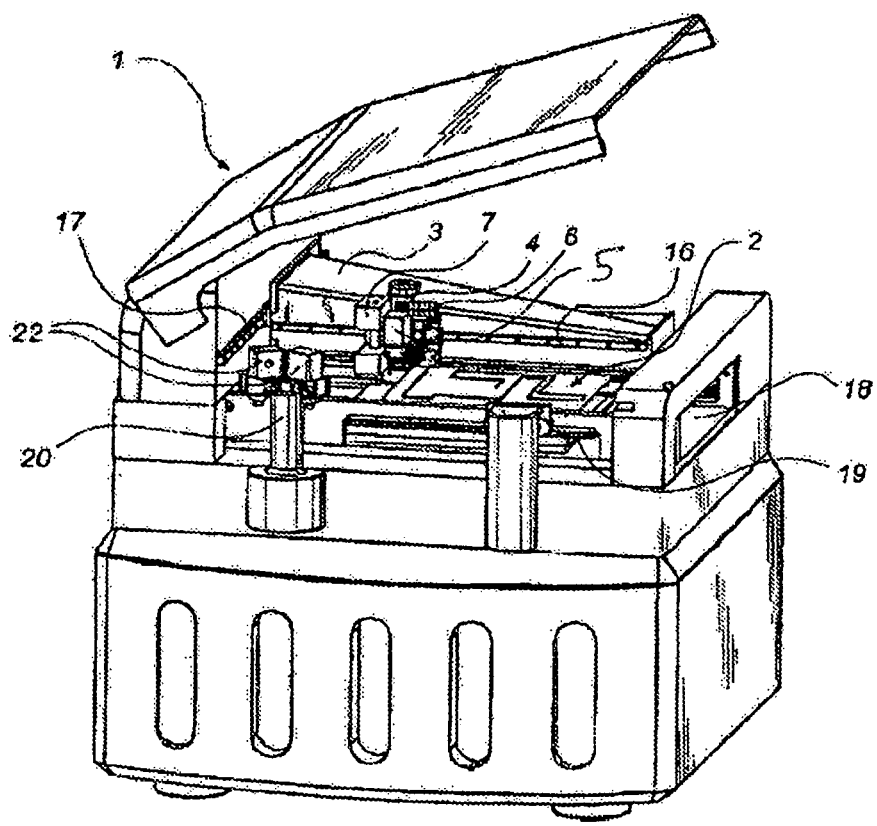
FIG. 1 is a perspective view showing a general outline of a conventional machine to apply viscous medium including a system for jetting.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", an and the may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the context of the present application, it is to be noted that the term "viscous medium" should be understood as highly viscous medium with a viscosity (e.g., dynamic viscosity) typically about or above 1 Pa s (e.g., solder paste, solder flux, adhesive, conductive adhesive, or any other kind of medium of fluid used for fastening components on a substrate, conductive ink, resistive paste, or the like, all typically with a viscosity about or above 1 Pa s). The term "jetted droplet", or "shot" should be understood as the volume of the viscous medium that is forced through the jetting nozzle and moving towards the substrate in response to an impact of the impacting device.

In the context of the present application, it is noted that the term "jetting" should be interpreted as a non-contact deposition process that utilizes a fluid jet to form and shoot droplets of a viscous medium from a jetting nozzle onto a substrate, as compared to a contact dispensing process, such as "fluid wetting". In contrast to a dispenser and dispensing process where a needle in combination with, for contact dispensing, the gravitation force and adhesion force with respect to the surface is used to dispense viscous medium on a surface, an ejector or jetting head assembly for jetting or shooting viscous medium should be interpreted as an apparatus including an impacting device, such as an impacting device including, for example, a piezoelectric actuator and a plunger, for rapidly building up pressure in a fluid chamber by the rapid movement (e.g., rapid controlled mechanical movement) of an impacting device (e.g., the rapid movement of a plunger) over a period of time that is more than about 1 microseconds, but less than about 50 microseconds, thereby providing a deformation of the fluid in the chamber that forces droplets of viscous medium through a jetting nozzle. In one implementation, an ejection control unit applies a drive voltage intermittently to a piezoelectric actuator, thereby causing an intermittent extension thereof, and a reciprocating movement of a plunger with respect to the assembly housing of the ejector or jetting assembly head.

"Jetting" of viscous medium should be interpreted as a process for ejecting or shooting droplets of viscous medium where the jetting of droplets of the viscous medium onto a surface is performed while the at least one jetting nozzle is in motion without stopping at each location on the workpiece where viscous medium is to be deposited. Jetting of viscous medium should be interpreted as a process for ejecting or shooting droplets of viscous medium where the ejection of a droplet through a nozzle is controlled by an impacting device building up a rapid pressure impulse in a fluid chamber over a time period that typically is more than about 1 microseconds and less than about 50 microseconds. For the movement of the impacting device to be rapid enough to build up a pressure impulse in the fluid chamber to force individual droplets or shots of the relatively highly viscous fluids (with a viscosity of about or above 1 Pa s) out of the chamber through the jetting nozzle, the break-off is induced by the impulse of the shot itself and not by gravity or the movement of a needle in an opposite direction. A volume of each individual droplet to be jetted onto the workpiece may be between about 100 pL and about 30 nL. A dot diameter for each individual droplet may be between about 0.1 mm and about 1.0 mm. The speed of the jetting, i.e. the speed of each individual droplet, may be between about 5 m/s and about 50 m/s. The speed of the jetting mechanism, e.g. the impacting mechanism for impacting the jetting nozzle, may be as high as between about 5 m/s and about 50 m/s but is typically smaller than the speed of the jetting, e.g. between about 1 m/s and about 30 m/s, and depends on the transfer of momentum through the nozzle.

The terms "jetting" and "jetting head assembly" in this disclosure and the claims, refer to the break-off of a fluid filament induced by the motion of the fluid element in contrast to a slower natural break-off akin to dripping where the a break-off of a fluid filament is driven for example by gravity or capillary forces.

In order to distinguish "jetting" of droplets of a viscous medium using a "jetting head assembly" such as an ejector-based non-contact jetting technology from the slower natural dripping break-off driven by gravity or capillary forces, we introduce below non-dimensional numbers that describe a threshold for the dripping-jetting transition for filament break-off for different cases and fluids that are driven by different physical mechanisms.

For elastic fluids, the terms "jetting" and "jetting head assembly" refer to the definition of jetting droplets by reference to the Weissenberg number, $Wi=\lambda U_{jet}/R$, where $\lambda$ is the dominant relaxation time of the fluid, $U_{jet}$ is the speed of the fluid and R is the radius of the jet, can be used and the threshold for dripping-jetting is approximately $20<Wi_{th}<40$.

For fluids where break-off is controlled by viscous thinning, the terms "jetting" and "jetting head assembly" refer to the definition of jetting droplets by reference to the Capillary number, described by $Ca=\eta_0 U_{jet}/\gamma$, where $\eta^0$ is the yield viscosity and $\gamma$ is the surface tension, can be used to introduce a threshold for dripping-jetting of $Ca_{the} \approx 10$.

For fluids where break-off is dominated by inertial dynamics, the terms "jetting" and "jetting head assembly" refer to the definition of jetting droplets by reference to the Weber number, expressed as $\rho U^2 jetR/\gamma$, where $\rho$ is the fluid density, can be used to introduce a jetting-dripping threshold of $We_{th} \approx 1$.

The ability to eject a more precise and/or accurate volume of viscous medium from a given distance at a specific position on a workpiece while in motion are hallmarks of viscous jetting. These characteristics allow the application of relatively highly viscous fluids (e.g., above 1 Pa s) while compensating for a considerable height variation on the workpiece (h=about 0.4 to about 4 mm). The volumes are relatively large compared to ink jet technology (between about 100 pL and about 30 nL) as are the viscosities (viscosities of about or above 1 Pa s).

At least some example implementations of the technology disclosed provide increased speed of application due to the jetting "on the fly" principle of ejector-based jetting technology applying viscous medium without stopping for each location on the workpiece where viscous medium is to be deposited. Hence, the ability of ejector-based jetting technology of jetting droplets of the viscous medium onto a first (horizontal) surface is performed while the at least one jetting nozzle is in motion without stopping at each location provides an advantage in terms of time savings over capillary needle dispensing technology.

Typically, an ejector is software controlled. The software needs instructions for how to apply the viscous medium to a specific substrate or according to a given (or alternatively, desired or predetermined) jetting schedule or jetting process. These instructions are called a "jetting program". Thus, the jetting program supports the process of jetting droplets of viscous medium onto the substrate, which process also may be referred to as "jetting process" or "printing process". The jetting program may be generated by a pre-processing step performed off-line, prior to the jetting process.

As discussed above, the term "viscous medium" may be solder paste, flux, adhesive, conductive adhesive, glue or any other kind of medium used for fastening components on a workpiece, substrate, conductive ink, resistive paste, or the like. However, example embodiments should not be limited to only these examples. As discussed herein, the term "deposit" refers to an amount of viscous medium applied at a position on a workpiece as a result of one or more jetted droplets (also referred to as shots).

For at least some solder paste applications, the solder paste may include between about 40% and about 60%, inclusive, by volume of solder balls and the rest of the volume is solder flux. The solder balls are typically about 20 microns in diameter, or between about 10 and about 30 microns, inclusive, in diameter.

In at least some solder paste applications, the volume percent of solder balls of average size may be in the range of between about 5% and about 40%, inclusive, of the entire volume of solid phase material within the solder paste. In other applications, the average diameter of the first fraction of solder balls may be within the range of between about 2 and about 5 microns, inclusive, while the average diameter of a second fraction of solder balls may be between about 10 and about 30 microns, inclusive.

As discussed herein, the term "deposit size" refers to the area on the workpiece, such as a substrate, that a deposit will cover. An increase in the droplet volume generally results in an increase in the deposit height as well as the deposit size.

A "workpiece" may be a board (e.g., a printed circuit board (PCB) or flexible PCB), a substrate for ball grid arrays (BGA), a flexible substrate (e.g., paper) chip scale packages (CSP), quad flat packages (QFP), wafers, flip-chips, or the like.

As discussed herein, movement is discussed in terms of the x-, y-, and z-directions. It should be understood, however, that movement in each of these directions may also be referred to as movement in the x-, y- or z-dimension, respectively. Thus, if a component moves in each of the x-, y- and z-directions, that component may be said to move three dimensionally or in three dimensions.

Bi-Axial Jetting Example Embodiment

At least one example embodiment provides a bi-axial jetting apparatus and method for depositing/jetting viscous medium on a workpiece. At least this example embodiment provides a bi-axial mechanical solution for multiple depositing heads where at least one of the depositing heads is a jetting head. In one implementation, at least one of the multiple depositing heads may be a dispensing head.

The bi-axial jetting apparatus and method may increase production speed when jetting viscous medium on a workpiece held at a fixed position with respect to the movement of the jetting heads. The increase in jetting speed for the multiple head configuration is obtained through a multi-beam gantry where each depositing head moves independently on a dedicated beam, and each beam is configured to move independently in a direction perpendicular to the direction of movement of the depositing heads.

In this example, the depositing head assemblies are configured to move concurrently and/or simultaneously in three dimensions.

Figure 8A:
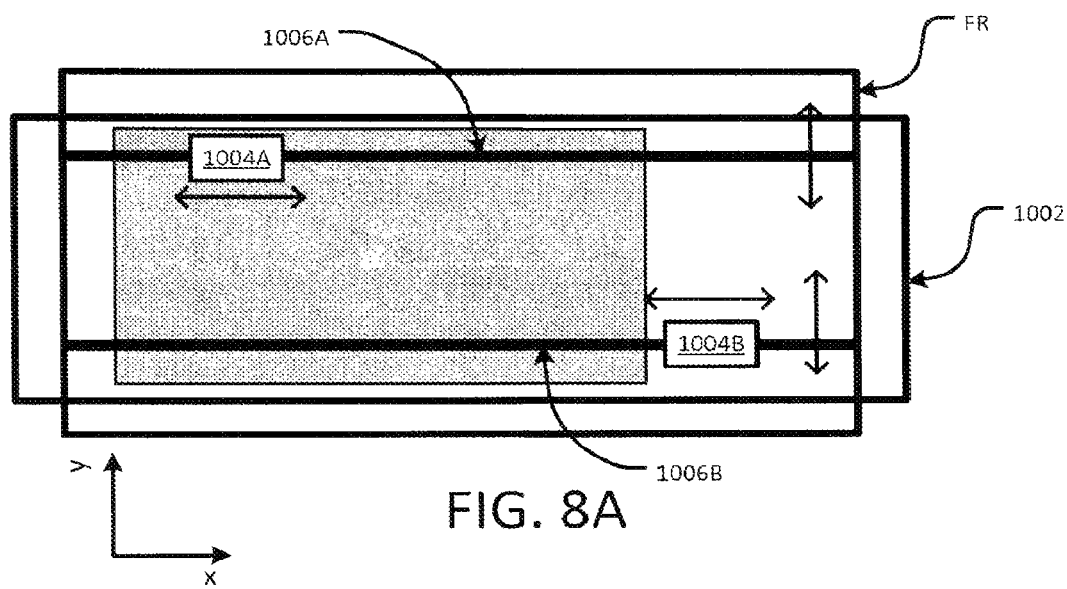
FIG. 8A is a schematic plan view illustrating an example embodiment of a bi-axial jetting apparatus for depositing and/or jetting viscous medium on a workpiece.
Figure 8B:
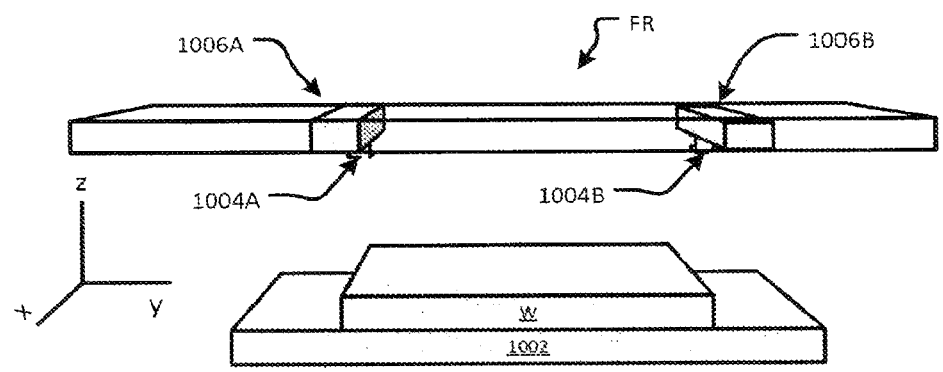
FIG. 8B is a front perspective view of the bi-axial jetting apparatus shown in FIG. 8A.

FIG. 8A is a schematic plan view illustrating an example embodiment of a bi-axial jetting apparatus for depositing/jetting viscous medium on a workpiece. FIG. 8B is a front perspective view of the bi-axial jetting apparatus shown in FIG. 8A.

Referring to FIGS. 8A and 8B, the bi-axial jetting apparatus includes a platform 1002 configured to hold a workpiece W. A frame FR is arranged above the platform 1002. The frame FR includes at least two independent gantry beams 1006A and 1006B arranged in parallel with one another and longitudinally in the x-direction. A first depositing head assembly 1004A is arranged on the first gantry beam 1006A, and a second depositing head assembly 1004B is arranged on the second gantry beam 1006B to enable more efficient depositing of viscous medium on the workpiece W. Each depositing head assembly 1004A and 1004B is configured to deposit the same or different viscous medium on the workpiece W. An example depositing head assembly will be discussed in more detail below. According to at least some example embodiments, the depositing head assemblies 1004A and 1004B are configured to concurrently and/or simultaneously deposit viscous medium on the workpiece W.

The first and second gantry beams 1006A and 1006B are reciprocally and movably connected between opposite sides of the frame FR, which is rigidly fixed in (or as part of) the bi-axial jetting apparatus. The first and second gantry beams 1006A and 1006B may be connected to the frame FR using bearings or the like so as to enable the first and second gantry beams 1006A and 1006B to slide along the frame FR in the y-direction, which is perpendicular to the x-direction. Movement of the first and second gantry beams 1006A and 1006B may be driven by linear motors (not shown), which are well-known in the art.

The depositing head assemblies 1004A and 1004B are movably connected to respective ones of the gantry beams 1006A and 1006B such that the depositing head assemblies 1004A and 1004B are movable in the x-direction along the respective gantry beams 1006A and 1006B. Movement of the depositing head assemblies 1004A and 1004B may be driven by linear motors (not shown). In this example, the direction of movement of the gantry beams 1006A and 1006B is perpendicular or substantially perpendicular to the direction of movement of the depositing head assemblies 1004A and 1004B.

Control of the gantry beams 1006A and 1006B is coordinated to prevent collisions between the gantry beams 1006A and 1006B and the depositing head assemblies 1004A and 1004B. The coordinated motion of the gantry beams 1006A and 1006B and the depositing head assemblies 1004A and 1004B, together with a linear motion ability of the depositing head assemblies 1004A and 1004B in the z-direction, enables depositing heads to move (e.g., simultaneously and/or concurrently) in three-dimensional space, while depositing viscous medium on the workpiece W.

The coordinated motion of the depositing head assemblies 1004A and 1004B also allows for feed-back based jetting/depositing strategies and/or methods in which unacceptable variations in volume of viscous medium deposited by one depositing head may be reactively repaired by another depositing head. This may suppress and/or eliminate the need for an additional inspection step. In this regard, a real-time reconfiguration of the depositing path for at least one of the depositing heads may be utilized.

The bi-axial jetting apparatus shown in FIGS. 8A and 8B is configured such that the depositing head assemblies 1004A and 1004B are able to deposit viscous medium on any portion of the workpiece W; that is, the depositing head assemblies 1004A and 1004B are configured to deposit viscous medium on the entire surface of the workpiece W. In some embodiments of the implementation shown in FIGS. 8A and 8B, one of the depositing head assemblies 1004A and 1004B is a jetting head assembly shooting droplets of viscous medium and the other depositing head assembly is a dispenser assembly configured to perform capillary needle dispensing of viscous medium (e.g., glue) on the workpiece.

The depositing head assemblies 1004A and 1004B may be configured to: shoot different types/classes of solder pastes; shoot droplets with different shot sizes/ranges (e.g., overlapping or non-overlapping ranges); and/or shoot droplets of various types of viscous media (solder paste, glue, etc.). Additionally, the depositing head assemblies 1004A and/or 1004B may be used for add-on depositing, jetting and/or repair as desired.

According to at least some example embodiments, at least one of the at least two depositing head assemblies 1004A and 1004B may be a dispensing head (e.g., for dispensing glue) and at least one other of the at least two jetting head assemblies 1004A and 1004B may be an ejector based jetting head assembly for shooting solder paste. Example deposit volumes, shot sizes, and types of viscous medium for the jetting and dispensing are shown below in Table 1. Although some examples shown in Table 1 are discussed with regard to implementations of the technology disclosed using a dispensing head together with the at least one jetting head configured to shoot droplets of viscous medium, according to other implementations of the technology disclosed both heads are jetting heads.

TABLE 1

| | Jetting/Dispensing | Type of Viscous Medium | Shot/dot Size | Deposit Volume (approx. nL) |
| --- | --- | --- | --- | --- |
| a) | Jetting | Solder paste | Small | 1-5 nL |
| | Jetting | Solder paste | Regular | 5-15 nL |
| b) | Jetting | Solder paste | Regular | 5-15 nL |
| | Jetting | Solder paste | Large | 15-50 nL |
| c) | Jetting | Solder paste | Regular | 5-15 nL |
| | Dispensing | Adhesive | Regular | 5-20 nL |
| d) | Jetting | Solder paste | Regular | 5-15 nL |
| | Jetting | Conductive adhesive | Regular | 5-20 nL |
| e) | Jetting | Adhesive | Regular | 5-20 nL |
| | Dispensing | Conductive adhesive | Regular | 5-20 nL |
| f) | Jetting | Solder paste | Regular | 5-15 nL |
| | Dispensing | Underfill | Regular | 10-50 nL |

The diameters of the shot/dot size depend on the form of the deposit. In one example, however, an approximate diameter for deposit volume of about 1 nL is between about 120 μm and 150 μm; an approximate diameter for deposit volume of about 5 nL is between about 250 μm and about 350 μm; an approximate diameter for deposit volume of about 15 nL is between about 450 μm and about 550 μm; and an approximate diameter for deposit volume of about 50 nL is between about 600 μm and about 700 μm.

If at least two (ejector-based) jetting head assemblies are used to shoot viscous medium with different shot sizes, the shot sizes for the at least two jetting heads may be in the range of about 1-50 nL depending on the viscous medium to be jetted.

If at least two (ejector-based) jetting head assemblies are used to shoot different types of viscous medium, it may be advantageous to shoot solder paste with one of the jetting head assemblies and adhesive, conductive adhesive/glue or underfill with the other jetting head assembly because the current surface mount process may benefit from a module adapted to either mixed production, alternative board modalities, repair applications, etc.

Although only two depositing head assemblies 1004A and 1004B and two gantry beams 1006A and 1006B are shown in FIGS. 8A and 8B, example embodiments should not be limited to this example. Rather, example embodiments may include additional depositing head assemblies mounted on the gantry beams 1006A and/or 1006B and/or additional gantry beams including additional depositing head assemblies.

Depositing Head Assembly

Figure 2:
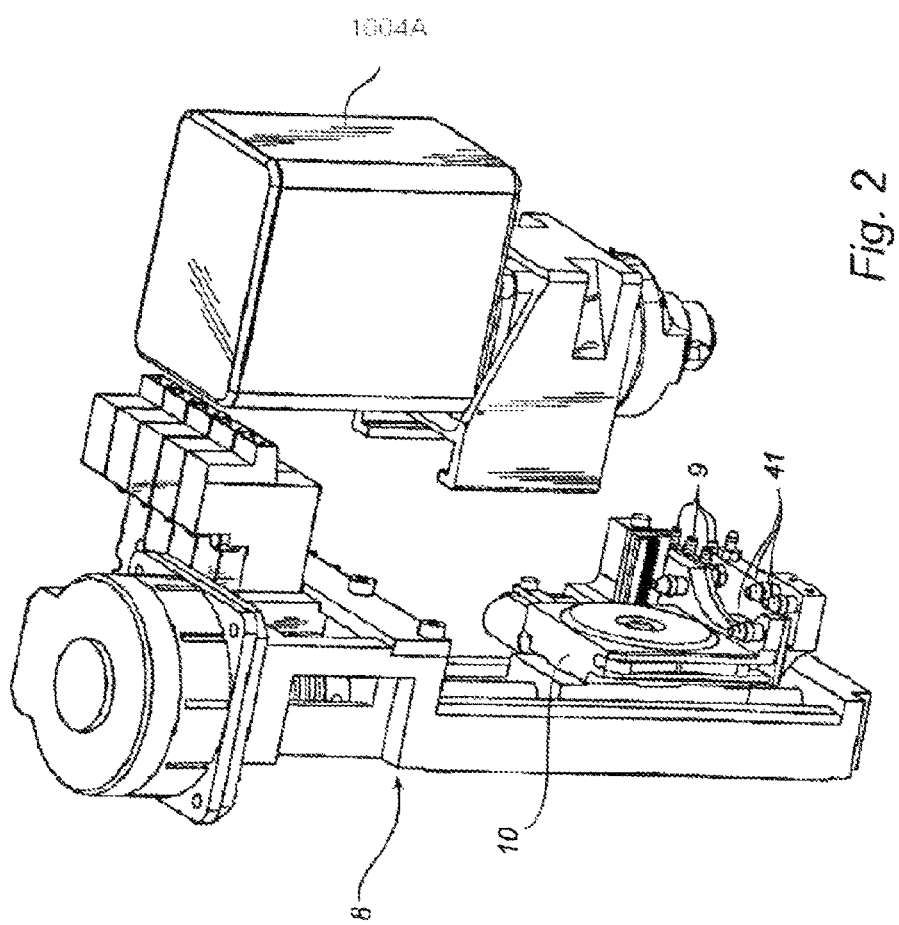
FIG. 2 is a schematic view of an example embodiment of a docking device and a jetting head assembly.
Figure 3:
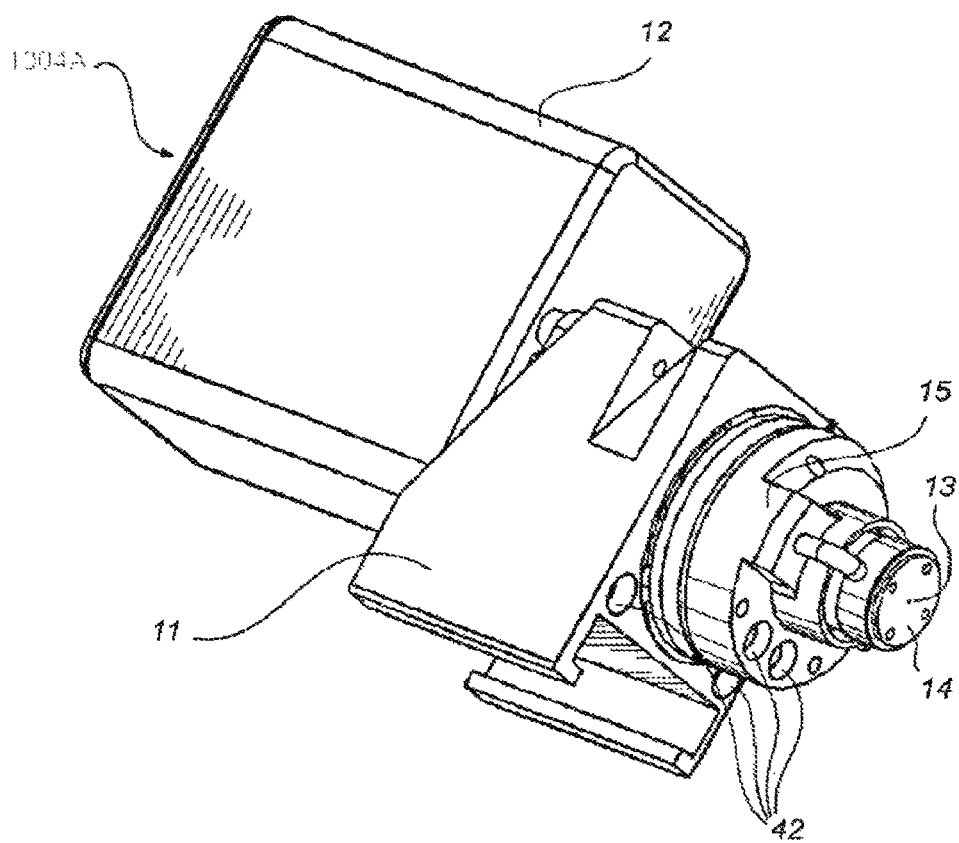
FIG. 3 is a schematic view showing the underside of the jetting head assembly shown in FIG. 2.

FIGS. 2 and 3 illustrate an example embodiment of a depositing head assembly (e.g., 1004A, 1004B) discussed above with regard to FIGS. 8A and 8B. Although the example shown in FIGS. 2 and 3 will be discussed with regard to depositing head assembly 1004A, it should be understood that the both depositing head assemblies 1004A and 1004B may be jetting head assemblies and that depositing head assembly 1004B may be the same or substantially the same as the depositing head assembly 1004A. In at least some example embodiments of the implementation shown in FIGS. 2 and 3, one of the depositing head assemblies 1004A and 10004B is a jetting head assembly shooting droplets of viscous medium and the other depositing head assembly is a dispenser assembly configured to perform dispensing of viscous medium on the workpiece.

Referring to FIGS. 2 and 3, the depositing head assembly 1004A includes an assembly holder 11, which is configured to connect the depositing head assembly 1004A to an assembly support 10 of a docking device 8. The depositing head assembly 1004A further includes an assembly housing 15 and a supply container 12 to provide a supply of viscous medium.

The depositing head assembly 1004A is connected to a vacuum ejector, and a source of pressurized air via a pneumatic interface having inlets 42 positioned to interface in airtight engagement with a complementary pneumatic interface having outlets 41 of the docking device 8. The outlets 41 are connected to inlet nipples 9 via internal conduits of the docking device 8.

The depositing head assembly 1004A may be configured to: shoot different types/classes of solder pastes; shoot droplets with different shot sizes/ranges (e.g., overlapping or non-overlapping ranges) and/or shoot droplets of various types of viscous media (solder paste, glue, etc.). Additionally, the depositing head assembly 1004A may be used for add-on jetting and/or repair.

Figure 4:
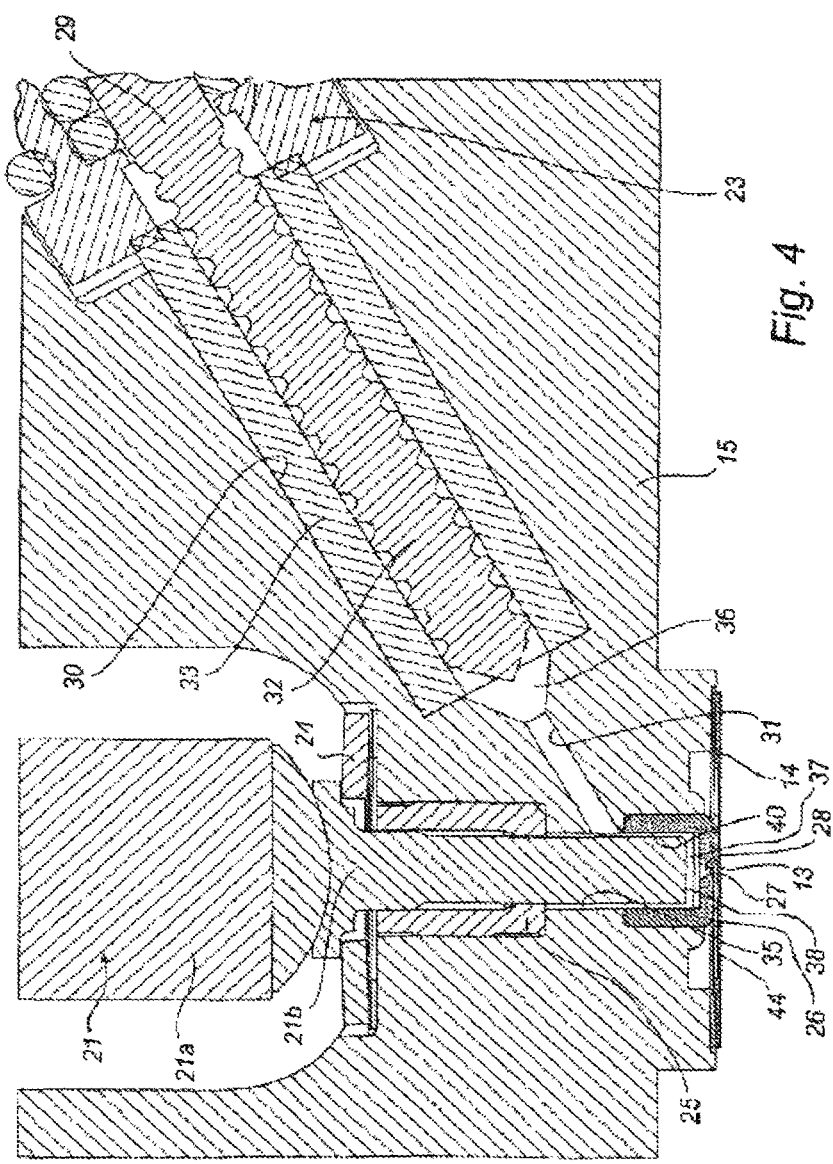
FIG. 4 is a schematic view showing a cut away portion of the jetting head assembly shown in FIG. 2.

FIG. 4 illustrates example contents and function of parts enclosed in the assembly housing 15 in more detail.

Referring to FIG. 4, the depositing head assembly 1004A includes an impacting device. In this example, the impacting device includes a piezoelectric actuator 21 having a number of relatively thin, piezoelectric elements stacked together to form an actuator part 21a. An upper end of the actuator part 21a is rigidly connected to the assembly housing 15. The depositing head assembly 1004A further includes a bushing 25 rigidly connected to the assembly housing 15. The impacting device further includes a plunger 21b, which is rigidly connected to a lower end of the actuator part 21a. The plunger 21b is axially movable while slidably extending through a piston bore 35 in the bushing 25. Cup springs 24 are provided to resiliently balance the plunger 21b against the assembly housing 15, and to provide a preload for the actuator part 21a. An ejection control unit (not shown) applies a drive voltage intermittently to the piezoelectric actuator 21, thereby causing an intermittent extension thereof, and hence a reciprocating movement of the plunger 21b with respect to the assembly housing 15, in accordance with pattern printing data.

An impact end surface 38 of the piston portion of the plunger 21b is arranged relatively close to the nozzle 26. A jetting chamber 37 is defined by the end surface 38 of the plunger 21b, the cylindrical inner wall of the nozzle 26, the upper surface 92 (FIG. 7) of the nozzle 26 and the upper portion 96 (FIG. 7) of the nozzle space 28. Thus, the jetting chamber 37 is connected to the upper portion of the nozzle space 28. Axial movement of the plunger 21b towards the nozzle 26 caused by the intermittent extension of the piezoelectric actuator 21 may result in a decrease (e.g., relatively rapid decrease) in the volume of the jetting chamber 37, and thus pressurization (e.g., a rapid pressurization) and jetting of the viscous medium in the nozzle space 28 through the nozzle outlet 27.

Solder paste is supplied to the jetting chamber 37 from the supply container 12 (FIG. 3) via a feeder 23. The feeder 23 includes an electric motor (not shown) having a motor shaft 29 partly provided in a tubular bore 30, which extends through the assembly housing 15 to an outlet port 36. The outlet port 36 communicates with the jetting chamber 37 via a tubular bore 31 provided in the housing 15, and an annular space formed between the piston portion of the plunger 21b and a cylindrical inner wall provided by the piston bore 35 and the upper cylindrical inner wall 40 of the nozzle 26, respectively. The annular space extends from the outlet of the tubular bore 31 down to the jetting chamber 37.

An end portion of the motor shaft 29 forms a rotatable feed screw 32 which is provided in, and coaxial with, the tubular bore 30, and which ends at the outlet port 36. An essential portion of the rotatable feed screw 32 is surrounded by a tube 33, made of an elastomer or the like, arranged coaxially therewith in the tubular bore 30. Threads of the rotatable feed screw 32 make sliding contact with the innermost surface of the tube 33. An example of an alternative to the tube is an array of resilient, elastomeric O-rings.

The depositing head assembly 1004A further includes a plate shaped or substantially plate shaped jetting nozzle 26 operatively directed against the workpiece, onto which small droplets of viscous medium are to be jetted. A through hole is formed through the jetting nozzle 26.

FIG. 7 illustrates an example implementation of the technology disclosed of the nozzle 26 in more detail.

Referring to FIG. 7, the through hole is defined by a first frustro-conical portion 91, extending from a top surface 92 of the nozzle 26 downwards through a portion of (e.g., most of) the thickness of the nozzle 26, and a second frustro-conical portion 93 extending upwards from a bottom surface 94 of the nozzle 26 to the plane of the top of the first frustro-conical portion 91. Thus, the tops of the frustro-conical portions 91, 93 are directed towards (or face) each other. The diameter of the top of the second frustro-conical portion 93 is larger than the diameter of the top of the first frustro-conical portion 91. The first and second frustro-conical portions 91, 93 are connected by a ring portion 95, which is in parallel with the top and bottom surfaces 92, 94 of the nozzle 26. The top of the first frustro-conical portion 91 defines a nozzle outlet 27 through which the droplets of viscous medium are jetted onto the workpiece. Furthermore, a nozzle space 28 is defined by the inner walls of the first frustro-conical portion 91. Thus, the nozzle outlet 27 is located at the ring portion 95 of the nozzle 26.

The upper portion 96 of the nozzle 26 (the base of the first frustro-conical portion 91) is arranged for receiving viscous medium, which is forced through the nozzle space 28 and out of the nozzle outlet 27.

Returning to FIG. 4, a plate or wall 14 (also shown in FIG. 3) is arranged below, or downstream, of the nozzle outlet 27, as seen in the jetting direction. The plate 14 is provided with a through hole 13, through which the jetted droplets pass without being hindered or negatively affected by the plate 14. Consequently, the hole 13 is concentric with the nozzle outlet 27. The plate 14 is spaced apart from the nozzle outlet 27. Between the plate 14 and the nozzle outlet 27, an air flow chamber 44 is formed. The chamber 44 is a space acting as a channel or guide that is connected with a vacuum ejector for generating an air flow as illustrated, for example, by the arrows of FIG. 7, at and past the nozzle outlet 27. In this example, the air flow chamber 44 is disc shaped, and the hole 13 acts as an inlet for the air flow towards and past the nozzle outlet 27.

The degree of filling of the nozzle space 28 before each jetting is set in order to obtain a controlled and individually adjusted amount of viscous medium in each droplet.

Figure 5A:
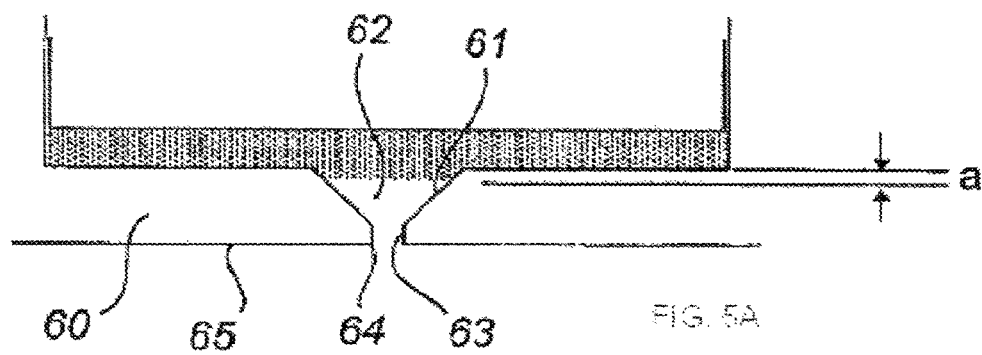
FIGS. 5A-5C illustrate different example degrees of viscous medium filling a nozzle space.
Figure 5B:
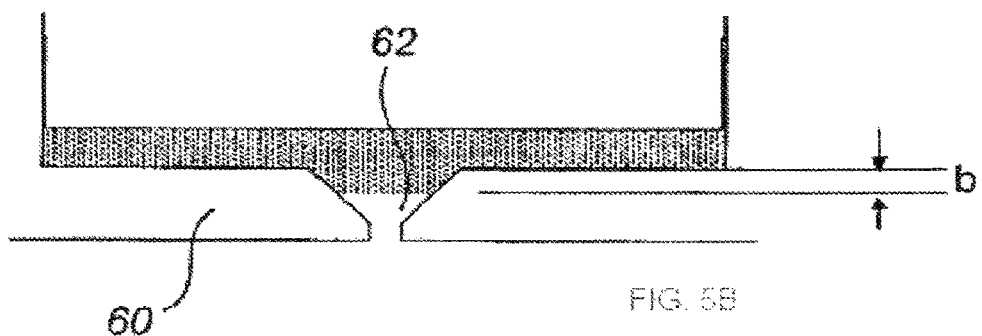
Figure 5C:
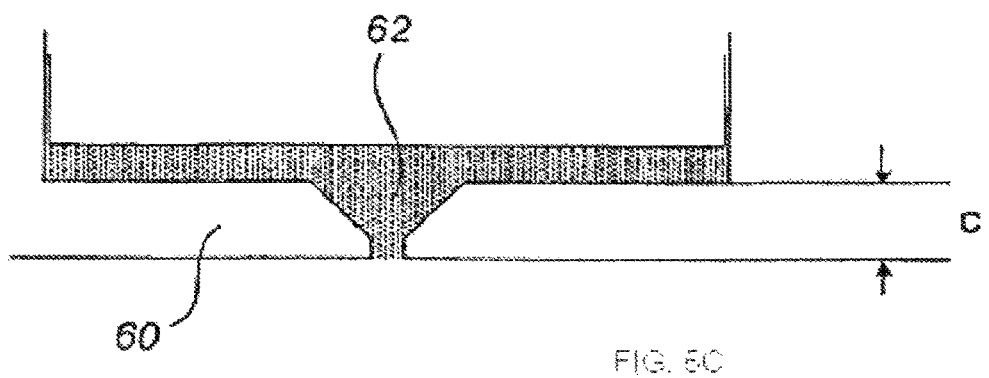

Example degrees of filling (e.g., 'a', 'b', and 'c') are shown in FIGS. 5A-5C, which illustrate an alternative configuration of the nozzle 60. The nozzle 60 still includes a frustro-conical portion 61 that defines a portion of the nozzle space 62. However, rather than the second frustro-conical portion 93, the nozzle 60 includes a cylindrical portion 63. The upper end of the cylindrical portion 63 coincides with the top end of the frustrum of a conical portion 61, and the lower end of the cylindrical portion 63 is positioned at the bottom surface 65 of the nozzle 60. In this alternative example, the nozzle outlet 64 is defined by the lower end of the cylindrical portion 63.

As seen from FIGS. 5A-5C, the nozzle space 62 is filled from the upper portion thereof towards the nozzle outlet 64. Thus, if the nozzle space 62 is filled to a relatively small extent, as shown in FIG. 5A, a comparatively small droplet is jetted, whereas if the nozzle space is filled or substantially filled, as in FIG. 5C, a larger droplet is jetted.

As shown in FIGS. 6A and 6B, before jetting a first droplet after a pause, or at start-up of the jetting machine, the accuracy of the degree of filling of the nozzle space, in these figures denoted 72, is ascertained. This may be obtained by feeding viscous medium into the nozzle space 72 via the feed screw 32 (shown in FIG. 4) such that the viscous medium fills or substantially fills the nozzle space 72, as shown in FIG. 6A. In this process, relatively small amounts of viscous medium may be forced out of the nozzle outlet 74. Thanks to the suction function obtained by air flow, excessive viscous medium is supressed and/or prevented from falling onto a board located beneath the nozzle 70. The air flow is schematically indicated by the horizontal arrows in FIG. 6A. It is noted that for ease of description, the plate downstream of the nozzle outlet has been omitted from FIGS. 6A and 6B, as well as in FIGS. 5A-5C. During this process, the plunger 21b is held in an idle position.

Returning to FIG. 4, the volume of the jetting chamber is increased by retracting the plunger 21b. The plunger 21b is retracted by controlling the actuator part 21a. The plunger 21b is retracted to move the end surface a given, desired or predetermined distance so as to empty the nozzle space 28/72 to an accurately given, desired or predetermined extent. In the example shown in FIG. 6B, the nozzle space 72 has been substantially emptied of viscous medium. Having now obtained the appropriate degree of filling of the nozzle space 28/72, the jetting device is ready for impacting. Droplets may then be jetted essentially immediately to ensure that there is little or no time for substantive changes in the jetting conditions to occur.

The jetting sequence then begins by feeding viscous medium into the nozzle space 28 in accordance with information on what size of droplet that is to be jetted. When the feeding is complete, the actuator 21 is energized to obtain an impacting movement of the plunger 21b. The impacting movement of the plunger 21b rapidly decreases the volume of the jetting chamber 37 to such an extent that the amount of viscous medium that is present in the nozzle space 28 is jetted out of the nozzle outlet 27 and onto the workpiece.

Uni-Axial Jetting Example Embodiment

At least one other example embodiment provides a uni-axial jetting apparatus and method to deposit and/or jet viscous medium on a workpiece. In at least this example embodiment, multiple depositing head assemblies are attached to a single gantry beam. The depositing head assemblies are configured to move vertically as well as independently along the gantry beam. The gantry beam is configured to move in a direction perpendicular to the directions of movement of the depositing head assemblies. In this example embodiment, the depositing head assemblies are movable together in one direction (e.g. the y-direction) and independently in two other directions (e.g., the x-direction and the z-direction), which are perpendicular to the first direction. In this example, the depositing head assemblies are configured to move concurrently and/or simultaneously in three dimensions. In one example, at least one of the depositing head assemblies may be a dispensing head assembly.

Uni-axial jetting apparatuses and methods according at least some example embodiments may increase jetting speed by having multiple (e.g., two) depositing heads deposit/jet viscous medium on a workpiece concurrently and/or simultaneously. According to at least this example embodiment, multiple (e.g., two) different types of depositing heads may be used to remove the need to exchange depositing heads during production.

Figure 9A:
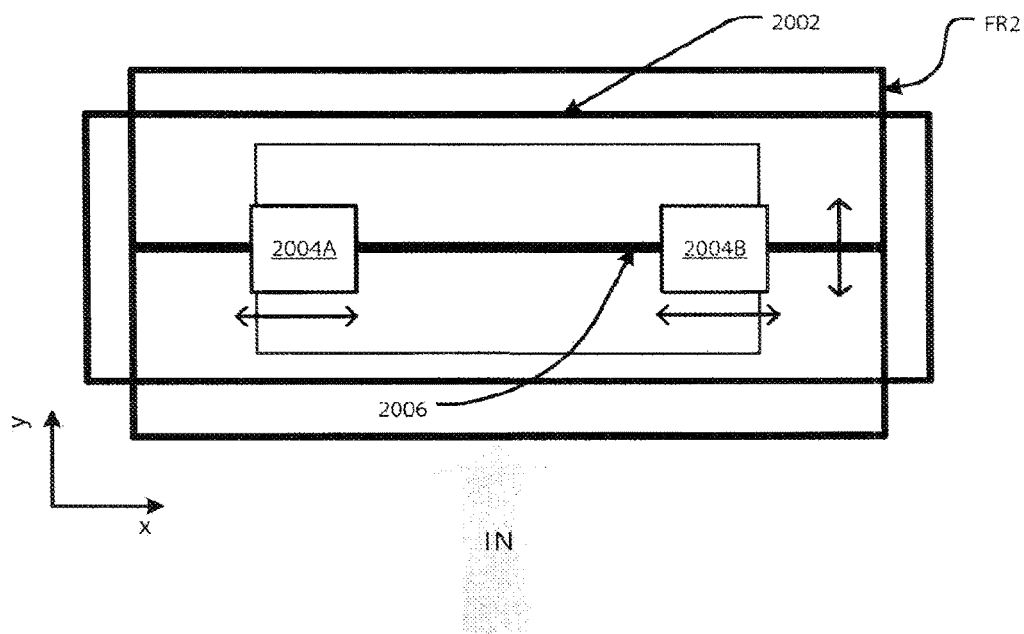
FIG. 9A is a schematic plan view illustrating an example embodiment of a uni-axial jetting apparatus for depositing and/or jetting viscous medium on a workpiece.
Figure 9B:
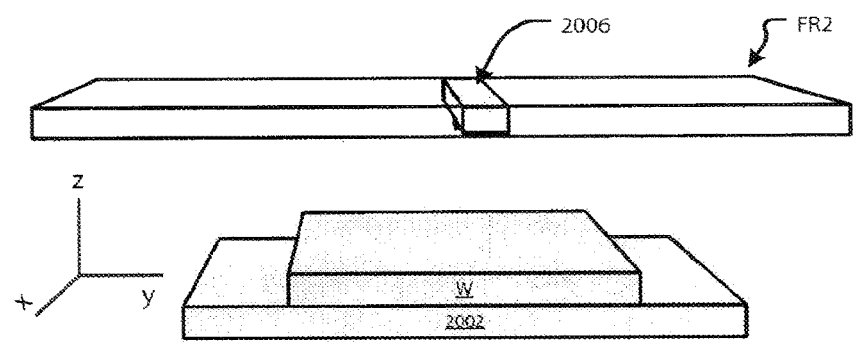
FIG. 9B is a front perspective view of the uni-axial jetting apparatus shown in FIG. 9A.

FIG. 9A is a schematic plan view illustrating an example embodiment of a uni-axial jetting apparatus for depositing and/or jetting viscous medium on a workpiece. FIG. 9B is a front perspective view of the uni-axial jetting apparatus shown in FIG. 9A.

Referring to FIGS. 9A and 9B, the uni-axial jetting apparatus includes a platform 2002 configured to hold a workpiece W. A frame FR2 is arranged above the platform 2002 such that the workpiece W is held below the gantry beam 2006 and depositing head assemblies 2004A and 2004B. The uni-axial jetting apparatus is configured such that the depositing head assemblies 2004A and 2004B are able to deposit viscous medium on any portion of the workpiece W; that is, the depositing head assemblies 2004A and 2004B are configured to deposit viscous medium on the entire surface of the workpiece W.

The single gantry beam 2006 is reciprocally and movably fixed to opposite ends of the frame FR2 in the same or substantially the same manner as the gantry beams 1006A and 1006B discussed above with regard to FIGS. 8A and 8B. At least two depositing head assemblies 2004A and 2004B are reciprocally and movably fixed to the gantry beam 2006. The at least two depositing head assemblies 2004A and 2004B are fixed to the gantry beam 2006 in the same or substantially the same manner as the depositing head assemblies 1004A and 1004B discussed above with regard to FIGS. 8A and 8B. The at least two depositing head assemblies 2004A and 2004B are configured to move longitudinally along the gantry beam 2006.

Each of the depositing head assemblies 2004A and 2004B is configured to deposit the same or different viscous medium on a surface of the workpiece W extending in the x-y dimension. In one example, each depositing head assembly 2004A and 2004B may be the same or substantially the same as the depositing head assembly 1004A discussed above. According to at least this example embodiment, the depositing head assemblies 2004A and 2004B are configured to concurrently and/or simultaneously deposit viscous medium on the workpiece W, but are controlled independently of each other.

The gantry beam 2006 is configured to slide along the frame FR2 in the y-direction, and the depositing head assemblies 2004A and 2004B are configured to move independent of each other in the x and z directions. The movement of the depositing head assemblies 2004A and 2004B are coordinated so that the depositing head assemblies 2004A and 2004B do not collide.

The depositing head assemblies 2004A and 2004B may be configured to: shoot different types/classes of solder pastes; shoot droplets with different shot sizes/ranges (e.g., overlapping or non-overlapping ranges); and/or shoot droplets of various types of viscous media (solder paste, glue, etc.). Additionally, the depositing head assemblies 2004A and/or 2004B may be used for add-on depositing, jetting and/or repair as desired.

According to at least some example embodiments, at least one of the at least two depositing head assemblies 2004A and 2004B may be a dispensing head (e.g., for dispensing glue) and at least one other of the at least two depositing head assemblies 2004A and 2004B may be an ejector based jetting head assembly for shooting solder paste. Example deposit volumes, shot sizes, and types of viscous medium for the jetting and dispensing are shown above in Table 1.

As with the example embodiment shown in FIGS. 8A and 8B, if at least two (ejector-based) jetting head assemblies are used to shoot viscous medium with different shot sizes, the shot sizes for the at least two jetting heads may be in the range of about 1-50 nL depending on the viscous medium to be jetted.

If at least two (ejector-based) jetting head assemblies are used to shoot different types of viscous medium, it may be advantageous to shoot solder paste with one of the jetting head assemblies and adhesive, conductive adhesive or underfill with the other jetting head assembly because the current surface mount process may benefit from a module adapted for mixed production, alternative board modalities, repair applications, etc.

Although only two depositing head assemblies 2004A and 2004B are shown in FIGS. 9A and 9B, example embodiments should not be limited to this example. Rather, example embodiments may include additional depositing head assemblies mounted on the gantry beam 2006 and movable in the x and z-directions.

Jetting Viscous Medium on Moving Workpiece

Example embodiments also provide methods and apparatuses for depositing and/or jetting viscous medium on a moving workpiece (e.g., a flexible substrate or the like).

According to at least some example embodiments, viscous medium may be deposited and/or jetted on a moving workpiece (e.g., flexible substrate or the like), for example, while compensating for workpiece topology and/or stretching.

At least some example embodiments may provide increased throughput for relatively simple and/or relatively high volume products requiring mounted components (e.g., relatively high throughput products produced on rolls, hybrid products with relatively few components produced in volume, etc.).

At least some example embodiments may also provide the ability to compensate for movement of the workpiece on the fly during jetting and/or depositing of viscous medium.

Figure 10:
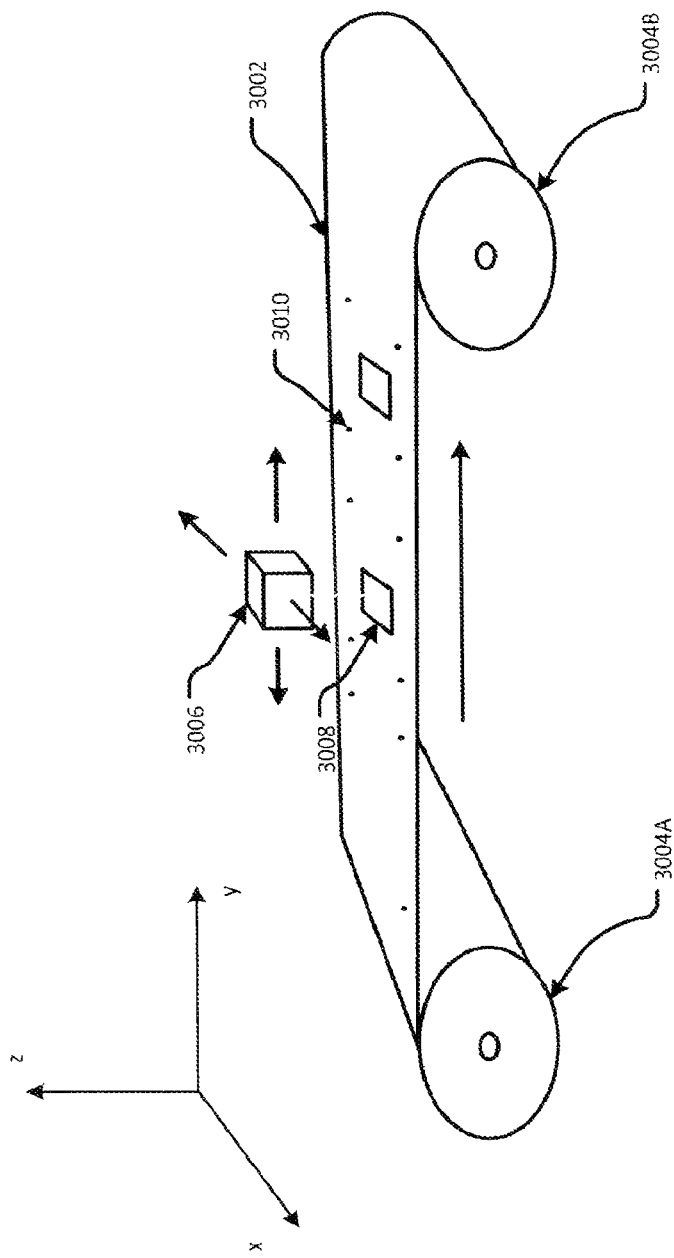
FIG. 10 illustrates an example embodiment of an apparatus for depositing and/or jetting viscous medium on moving workpieces.

FIG. 10 illustrates an example embodiment of an apparatus and method for depositing and/or jetting viscous medium on a moving workpiece. For example purposes, the example embodiment shown in FIG. 10 will be described with regard to a flexible substrate.

Referring to FIG. 10, the apparatus includes a first and a second supporting arrangement (e.g., cylindrical rollers) 3004A and 3004B. In the example shown in FIG. 10, the supporting arrangements 3004A and 3004B are cylindrical rollers, and will be discussed as such. However, example embodiments should not be limited to only this implementation.

The first and second cylindrical rollers 3004A and 3004B are configured to hold a flexible substrate 3002. The cylindrical rollers 3004A and 3004B may be driven by a linear motor (not shown) to move the flexible substrate 3002 in the y-direction from the first cylindrical roller 3004A to the second cylindrical roller 3004B.

To speed up the depositing and/or jetting of viscous medium on the flexible substrate, the flexible substrate 3002 maintains continuous motion while a depositing head assembly 3006 compensates for the motion of the flexible substrate 3002 by moving in the x- and y-directions during jetting. The depositing head assembly 3006 may also move in the z direction as discussed above.

In at least this example embodiment, the flexible substrate 3002 and the depositing head assembly 3006 move concurrently and/or simultaneously while the depositing head assembly 3006 deposits/jets viscous medium on the surface of the flexible substrate 3002. The depositing head assembly 3006 may be the same or substantially the same as the depositing head assembly 1004A discussed above. Thus, a detailed discussion of the depositing head assembly 3006 is omitted. Moreover, the depositing head assembly 3006 may be moved in any well-known manner, including that discussed herein with regard to other example embodiments.

According to at least the example embodiment shown in FIG. 10, the flexible substrate 3002 need not be stopped and/or secured to identify the fiducials 3010, and thereafter deposit a viscous medium (e.g., solder paste, conformal filler, conductive adhesives, etc.) on the flexible substrate 3002.

The intrinsic behavior of moving flexible substrates, which includes elastic properties and relatively small changes in lateral positioning, may require a repetitive calibration procedure to control the movement of the depositing head assembly 3006 in the plane of the moving flexible substrate 3002. The calibration procedure may be based on the movement of the fiducials 3010, which may be part of the jetting pattern or dedicated patterns for calibration purposes.

The correct placement of the deposit of viscous medium on the flexible substrate 3002 may be calculated using ballistic algorithms that take into account the relative speeds of the moving flexible substrate 3002 and the depositing head assembly 3006. The calibration procedure may also include a height calibration procedure, either optical or mechanical, to ensure the movement of the depositing head assembly 3006 in the vertical z-direction while in motion over the flexible substrate 3002.

Still referring to the example embodiment shown in FIG. 10, a compensatory algorithm may be used to measure the speed of the depositing head assembly 3006 relative to the moving flexible substrate 3002, for example, by using pads on the flexible substrate 3002 as discrete reference marks to enable more accurate deposition of viscous medium on the flexible substrate 3002.

Still referring to FIG. 10, the depositing head assembly 3006 may be configured to: shoot different types/classes of solder pastes; shoot droplets with different shot sizes/ranges (e.g., overlapping or non-overlapping ranges); and/or shoot droplets of various types of viscous media (e.g., solder paste, glue, etc.). Additionally, the depositing head assembly 3006 may be used for add-on depositing, jetting and/or repair as desired.

According to at least some example embodiments, the depositing head assembly 3006 may be a dispensing head (e.g., for dispensing glue) or an ejector based jetting head assembly for shooting solder paste. Example deposit volumes, shot sizes, and types of viscous medium for the jetting and dispensing are shown in Table 1.

In the example embodiment shown in FIG. 10, if more than one (ejector-based) jetting head assembly is used to shoot viscous medium with different shot sizes, the shot sizes for the at least two jetting heads may be in the range of about 1-50 nL depending on the viscous medium to be jetted.

If more than one (ejector-based) jetting head assembly is used to shoot different types of viscous medium, it may be advantageous to shoot solder paste with one of the jetting head assemblies and adhesive, conductive adhesive or underfill with the other jetting head assembly because the current surface mount process may benefit from a module adapted for mixed production, alternative board modalities, repair applications, etc.

Linescan Jetting Example Embodiment

One or more other example embodiments provide methods and apparatuses for linescan jetting and/or depositing of viscous medium on a workpiece using one or more depositing heads. At least this example embodiment utilizes a modular conveyor strategy.

At least this example embodiment enables jetting of workpieces (e.g., boards) based on a rectilinear strategy. According to at least one example embodiment, the rectilinear strategy may be combined with real-time topology measurements.

According to at least some example embodiments, linescan jetting may be utilized to deposit material on a populated workpiece and/or a workpiece with previously deposited material (e.g., paste). At least some example embodiments may be implemented in a module with a relatively small footprint.

According to at least some example embodiments, linescan jetting may be used to address add-on jetting, repair, etc. of populated workpieces.

One or more example embodiments of linescan jetting may also provide real-time compensation for topology measurements.

According to at least some example embodiments, workpieces (e.g., boards, cards or the like) are moved through a jetting apparatus incrementally and the depositing head is moved in at least two (e.g., three) dimensions. The movement of the workpiece may also be continuous or incremental and continuous. The movement directions of the depositing head are normal to the transport direction of the workpiece.

Figure 11A:
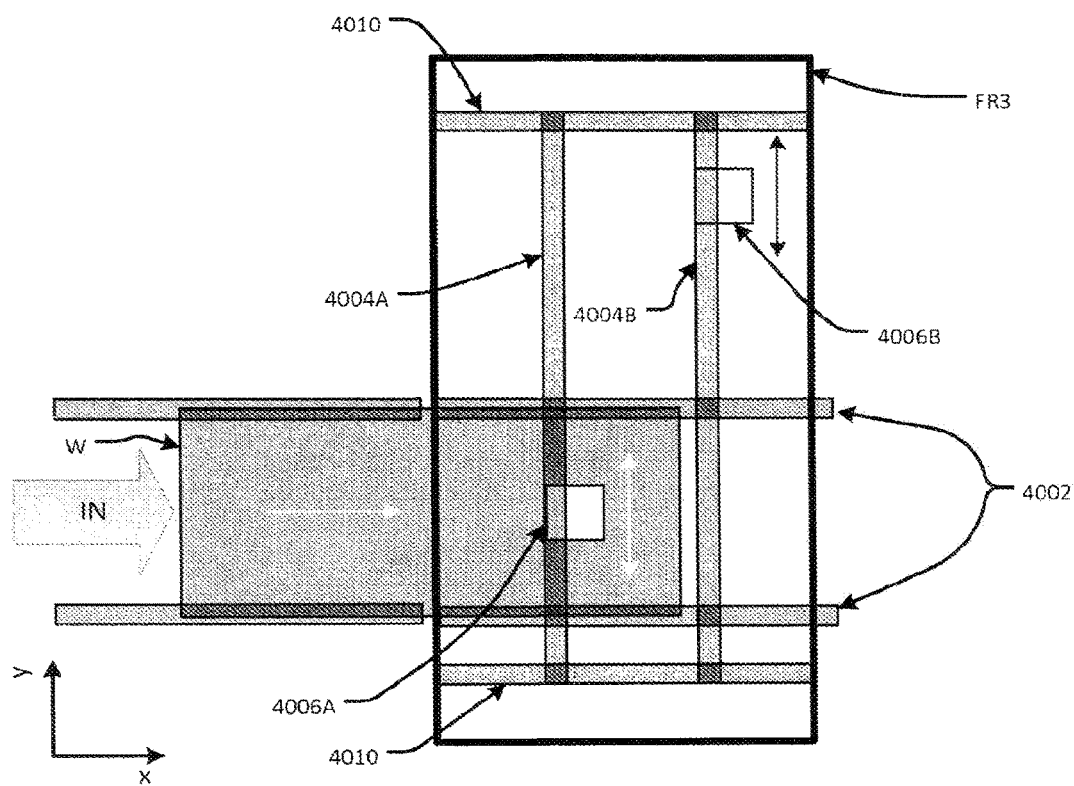
FIG. 11A is a schematic plan view of a linescan depositing/jetting apparatus according to an example embodiment.
Figure 11B:
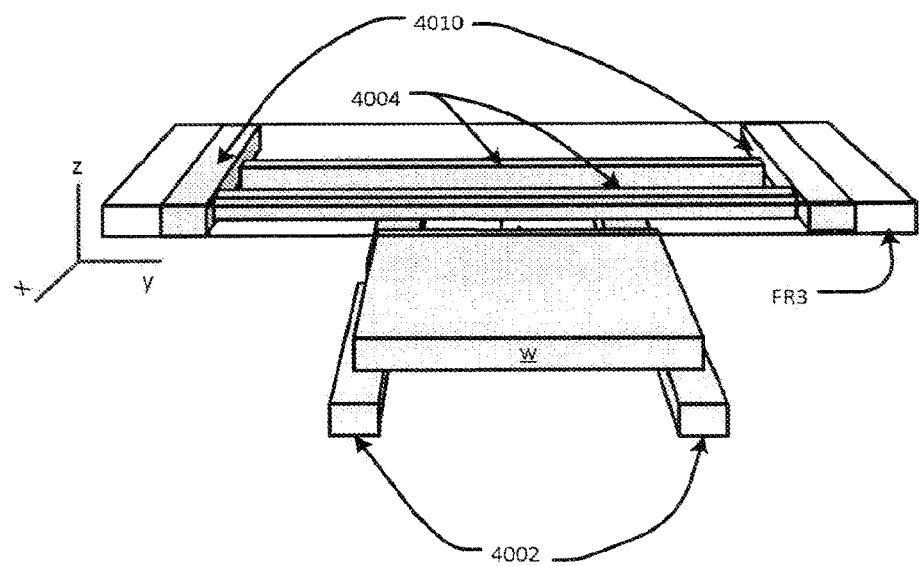
FIG. 11B is a front perspective view of the linescan depositing/jetting apparatus shown in FIG. 11A.

FIG. 11A is a schematic plan view of a linescan jetting apparatus according to an example embodiment. FIG. 11B is a front perspective view of the linescan jetting apparatus shown in FIG. 11A.

Referring to FIGS. 11A and 11B, the linescan jetting apparatus includes a modular conveyor 4002 to carry one or more workpieces W. The conveyor 4002 feeds and/or moves the workpiece W through the linescan jetting apparatus incrementally and/or continuously. The incremental and/or continuous movement of the workpiece W through the linescan jetting apparatus is controlled according to the resolution of the details to be formed on the workpiece W, such that the movement precision reaches pad limiting specifications.

According to at least some example embodiments, an improved (e.g., optimal) deposition strategy is proposed for pads present on a printed circuit board. The allotted deposits allow a certain positioning leniency that may be utilized when applying a 'travelling salesman' algorithm for the collected deposits, with the movement restriction of the line scan motion. The spacing of the allotted deposits and the positioning requirements on the pad deposits together with the positioning accuracy of the depositing head determine the x-motion of the beam. In one example, a positioning accuracy of $3\sigma_A x<50$ μm may be used for 0.4 pitch components. In this example, the position of the deposit with respect to the intended position is better than about 50 μm ($3\sigma_A x$).

Returning to FIGS. 11A and 11B, a frame FR3 is arranged above the conveyor 4002. A first set of beams 4010 are fixed longitudinally in the x-direction to opposite ends of the frame FR3. A second set of beams 4004A and 4004B are fixed between the first set of beams 4010 longitudinally in the y-direction. The first set of beams 4010 are spaced apart from one another about the length of the beams 4004A and 4004B.

A first depositing head assembly 4006A is reciprocally and movably fixed to the beam 4004A, and a second depositing head assembly 4006B is reciprocally and movably fixed to the beam 4004B. The first and second depositing head assemblies 4004A and 4004B may be fixed to respective beams 4004A and 4004B in the same manner as the depositing head assemblies 1004A and 1004B discussed above with regard to FIGS. 8A and 8B.

In the example embodiment shown in FIGS. 11A and 11B, the beams 4010, 4004A and 4004B are stationary, and the depositing head assemblies 4006A and 4006B move along the respective beams 4004A and 4004B in the y-direction. The depositing head assemblies 4006A and 4006B also move in the z-direction as discussed above with regard to other example embodiments.

The depositing head assemblies 4006A and 4006B may be the same or substantially the same as the depositing head assembly 1004A discussed above. Thus, a detailed discussion is omitted.

According to at least this example embodiment, the depositing head assemblies 4006A and 4006B move in at most only 2-directions (e.g., y and z) over the workpiece W, for example, while the workpiece W is temporarily at rest. Each of the depositing head assemblies 4006A and 4006B travels along a respective beam 4004A and 4004B arranged perpendicular to the direction of movement of the workpiece W on the conveyor 4002 when the workpiece W moves to a subsequent position.

The depositing head assemblies 4006A and 4006B may be configured to: shoot different types/classes of solder pastes; shoot droplets with different shot sizes/ranges (e.g., overlapping or non-overlapping ranges); and/or shoot droplets of various types of viscous media (solder paste, glue, etc.). Additionally, the depositing head assemblies 4006A and/or 4006B may be used for add-on depositing, jetting and/or repair as desired.

According to at least some example embodiments, at least one of the depositing head assemblies 4006A and 4006B may be a dispensing head (e.g., for dispensing glue) and at least one other of the depositing head assemblies 4006A and 4006B may be an ejector based jetting head assembly for shooting solder paste. Example deposit volumes, shot sizes, and types of viscous medium for the jetting and dispensing are shown above in Table 1.

As with the example embodiment shown in FIGS. 8A and 8B, if at least two (ejector-based) jetting head assemblies are used to shoot viscous medium with different shot sizes, then the shot sizes for the at least two jetting heads may be in the range of about 1-50 nL depending on the viscous medium to be jetted.

If at least two (ejector-based) jetting head assemblies are used to shoot different types of viscous medium, then it may be advantageous to shoot solder paste with one of the jetting head assemblies and adhesive, conductive adhesive or underfill with the other jetting head assembly because the current surface mount process may benefit from a module adapted to either mixed production, alternative board modalities, repair applications, etc.

Example embodiments of methods and apparatuses for line scan jetting of viscous material on a workpiece provide a basis for a relatively simple mechanical construction in that the movement of the depositing head assemblies is limited to the z-direction and only one of the x- and y-directions, which allows the complementary direction to be reduced.

The incremental movement of the workpiece W by the conveyor 4002 allows topological re-creation of the surface of the workpiece W via an optical linescan methodology as the workpiece enters the linescan jetting apparatus. The height information is sampled simultaneously and/or concurrently as jetting is performed on another part of the workpiece W and fed back to the control of the z-position of the jetting head assemblies 4006A and 4006B. The incremental topological description of the workpiece W is collected and allows for the advance or real-time planning of a path over the workpiece W as the workpiece W travels in the x-direction.

According to at least this example embodiment of the technology disclosed, the workpiece is moved through the linescan jetting apparatus in a step-wise movement forward in discrete steps. In this example, the steps of movement of the workpiece forward and the time for a depositing head to scan the surface of the workpiece in one scan (e.g., in the y-direction) while shooting droplets of viscous medium at given, desired or pre-determined positions/components while in motion may depend on the specific component footprints on the circuit board and their relative positioning.

The at least one depositing head may be configured to scan the workpiece in a direction perpendicular to the direction of movement of the workpiece. The scanning may be conducted in one scan movement for every step of movement forward of the workpiece. The scan of the surface of the workpiece while shooting droplets of viscous medium at given (or alternatively desired or pre-determined) positions/components while in motion may be conducted after each incremental step forward of the workpiece, and when the workpiece is not in motion relative to a stage that holds the workpiece.

The translational steps of the workpiece with respect to the gantry may range from centimeters to a minimum step in the range of about 50 μm. The speed to scan the workpiece in the y-direction is related to the speed of the linear motor, which may be on the order of about 0.5 m/s to about 1 m/s. In some implementations, the discrete translational steps whereby the workpiece is step-wise moved forward with respect to the gantry may be adapted to the application and may, for example, be in the range of about 0.1 mm to about 20 mm, inclusive. For example, each translational step may be adapted to correspond to the 0.4 mm pitch of a BGA or a portion of a 0.4 mm pitch of a ball grid arra (BGA, e.g., about 0.2 mm).

Figure 12:
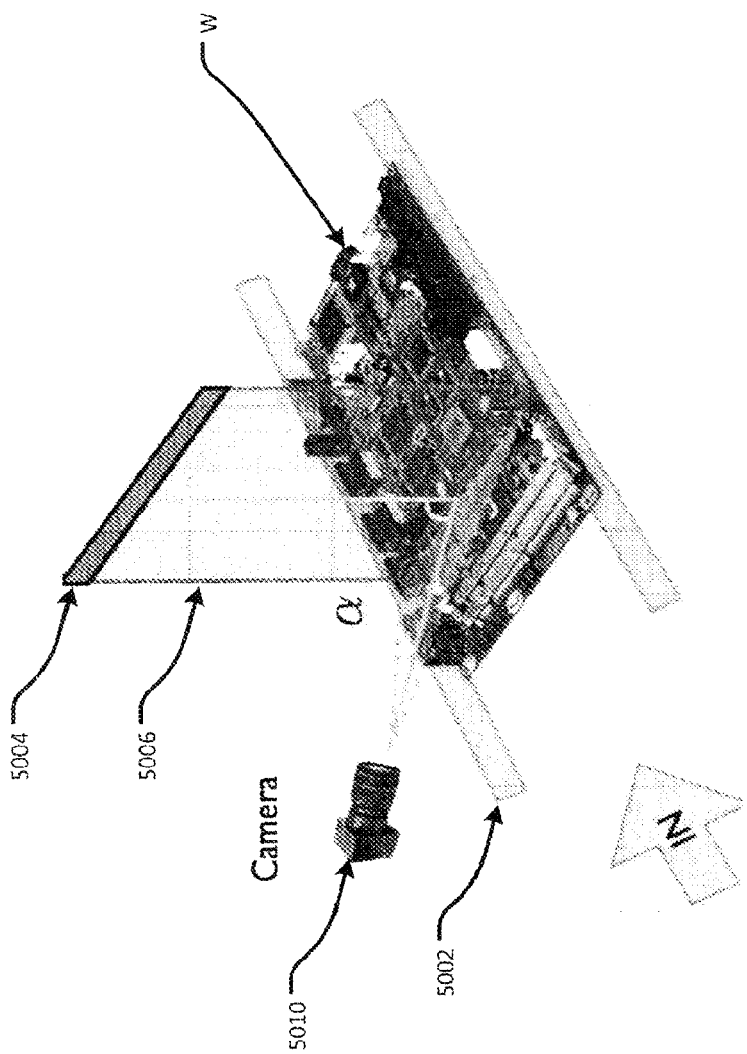
FIG. 12 illustrates an example of optical linescan methodology.

FIG. 12 illustrates an example of the optical linescan methodology.

Referring to FIG. 12, a workpiece W travels either continuously or discretely in the x-direction along the conveyor 5002. A one-dimensional laser-based surface topography is measured through the imaging of the resulting laser line from a projected laser plane 5006 from a low-power laser source 5004 on the surface of the workpiece W, with or without previously mounted components, by an imaging camera 5010 at a known angle α to the laser plane 5006.

The topographical information obtained through the optical linescan methodology discussed above is collected in a data set related to the position along the x-direction of the workpiece W, and utilized in the subsequent depositing action to enable a topographical following of the workpiece W with the jetting head.

The use of the second depositing head assembly 4006B in the example embodiment shown in FIGS. 11A and 11B may enable more dynamically stable mechanical construction if the motion of the depositing head assemblies 4006A and 4006B is such that the depositing head assemblies 4006A and 4006B move in opposite or counter directions. The first and second depositing assemblies 4006A and 4006B may be the same or substantially the same in order to decrease the depositing time by about half. Alternatively, the first and second depositing head assemblies 4006A and 4006B may be different. In the example shown in FIGS. 11A and 11B, the depositing head assemblies 4006A and 4006B may include jetting devices with different jetting materials to enable more flexible production of workpieces. The depositing head assemblies 4006A and 4006B may include jetting heads primed for different jetting volume spans allowing for more effective application of jetting material on the workpiece W.

Still referring to FIGS. 11A and 11B, according to at least one other example embodiment, only one of the depositing head assemblies 4006A and 4006B may be used for linescan jetting. The workpiece W may be moved into the depositing/jetting area in the y-direction in the same or substantially the same manner as discussed above with regard to FIGS. 8A and 8B or FIGS. 9A and 9B.

According to at least one other example embodiment, at least one of the depositing head assemblies in the depositing/jetting apparatuses shown in FIGS. 8A through 9B may be used for linescan jetting. In this example, the workpiece W may be moved into the jetting area in the y-direction in the same or substantially the same manner as discussed above with regard to FIGS. 8A and 8B or FIGS. 9A and 9B.

Example embodiments of depositing and/or jetting apparatuses and methods discussed herein may be used in a larger system for depositing/jetting viscous medium (e.g., solder paste or the like). Example embodiments may increase production speed and/or yield.

The generation of the jetting program for depositing/jetting viscous medium using at least two depositing head assemblies involves importing, to a generation program, substrate data relating to a unique given or predetermined substrate, or a unique given or predetermined set of identical or substantially identical substrates; and defining, on basis of the substrate data, where on the substrate the droplets are to be jetted by the at least two depositing head assemblies. In other words, viscous medium may typically be arranged to be jetted onto the substrate according to a given, desired or predetermined jetting program.

As an example, a computer program is used for importing and processing computer aided design (CAD) data or the like about a substrate. The CAD data may for example comprise data representing position and extension of contact pads, as well as data representing position, name, and leads of each individual component that is to be mounted on the substrate. The program can be used to determine where on the substrate the droplets are to be jetted and which depositing head assembly to be used for jetting that particular droplet, such that each component is provided with deposits having the required volume, lateral extension, and/or height. This is a process which requires knowledge of the size and volume of a single droplet, how many droplets that will be sufficient for covering the needs of a specific component, and where on the substrate each droplet should be placed.

When all droplet configurations for all components have been programmed, a jetting path template may be generated, which describes how the jetting nozzle is going to be moved (e.g., by a jetting machine operating one or more jetting head assemblies or ejectors) in order to jet the droplets of viscous medium onto the substrate. It is understood that the ejectors may operate concurrently or consecutively. The jetting path template is transferred to the jetting program which is used for running the jetting machine, and hence the ejector(s), accordingly. The jetting program may also comprise jetting parameters (e.g. for controlling the feeding of the viscous medium into the nozzle space) and for controlling the impact of the impacting device, in order to provide the substrate with the required deposits.

The technology disclosed is also advantageous in that it provides the possibility to correct printing errors by a first ejector or depositing head assembly by the supplemental jetting of droplets of the viscous medium by a second ejector or depositing head assembly onto the substrate without performing a separate inspection. This implementation may be based on a realisation that by arranging, for example, a droplet sensor arrangement between the jetting nozzle of a first ejector and the substrate, onto which the jetted droplets of viscous media is deposited, the jetting characteristics and the jetted droplets can be monitored during the (portion of) a jetting process/program associated with a first ejector, or depositing head assembly. Information may be obtained by the jetting machine, and the information may include, for example, information on whether droplets are jetted or not due to an impact of the impacting device. Thereby, missed drops may be detected without inspection of the surface of the substrate. If a jetted droplet due to an impact of the impacting device is not verified, then the information may be used for correction of the deposited volume by, for example, adding supplementary medium to the substrate by a second depositing head assembly where the correction may be performed simultaneously or on the fly, during the present printing process, or in an additional, supplementary printing process. Thereby, the need for time consuming downstream, posterior inspection of the deposits may be reduced.

The technology disclosed is also advantageous in that it provides the possibility to, in a supplementary jetting conducted by a second ejector, add viscous medium at a position on a workpiece to the viscous medium applied by a first ejector. The first ejector may then be configured to deposit viscous medium on a surface of a workpiece by shooting droplet volumes within a certain specified volume range (e.g., about 1-5 nL), and the supplemental jetting may be performed by a second ejector configured to deposit viscous medium within another specified range (e.g., about 5-15 nL) in order to deposit a total volume of about 20 nL on a position on the surface of the workpiece where the supplementary jetting of viscous medium may be performed simultaneously or on the fly, during the present printing process, or in an additional, supplementary printing process where the first ejector involved in a new jet printing job, for example, associated with a new separate board but performed on the same working area of the jetting machine as the first printing process.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A linescan jetting apparatus for at least one of depositing or jetting viscous medium on a workpiece, the apparatus comprising:
    a conveyor configured to carry the workpiece in a first direction;
    a first set of beams extending longitudinally between opposite sides of a depositing head assembly frame;
    a second set of beams extending longitudinally between the first set of beams in a direction that is perpendicular to a direction in which the first set of beams extends longitudinally, such that each beam of the second set of beams is connected at opposite ends to separate beams of the first set of beams, the second set of beams including a first beam and a second beam;
    a first depositing head assembly movably fixed to the first beam, the first depositing head assembly being configured to move along the first beam in a second direction, which is perpendicular to the first direction; and
    a second depositing head assembly fixed to the second beam, the second depositing head assembly being configured to move along the second beam in the second direction.

2. The apparatus of claim 1, wherein the conveyor is configured to move the workpiece incrementally in the first direction.

3. The apparatus of claim 1, wherein the first and second depositing head assemblies are configured to at least one of concurrently and simultaneously deposit viscous medium on the workpiece.

4. The apparatus of claim 1, wherein the first and second depositing head assemblies are configured to move in a third direction, which is perpendicular to the first and second directions.

5. The apparatus of claim 1, wherein the first and second depositing head assemblies are configured to at least one of,
    shoot different types and/or different classes of solder pastes,
    shoot droplets with different shot sizes and/or shot ranges, and
    shoot droplets of various types of viscous media.

* * * * *